Jan. 19, 1965  RYUTARO YAGI ETAL  3,165,786
APPARATUS FOR MAKING THIN SHEETS FROM SYNTHETIC RESIN
Filed Sept. 16, 1963

INVENTOR.
Ryutaro Yagi
Hitoshi Miki
Kensuke Fukami
BY
Wendroth, Lind
and Ponack, attorneys United States Patent Office 3,165,786
Patented Jan. 19, 1965

3,165,786
APPARATUS FOR MAKING THIN SHEETS FROM SYNTHETIC RESIN
Ryutaro Yagi, Aboshi-ku, Himeji, and Hitoshi Miki and Kensuke Fukami, Ibogun, Hyogo, Japan, assignors to Takiron Chemical Company Limited, Osaka, Japan
Filed Sept. 16, 1963, Ser. No. 309,118
Claims priority, application Japan, Nov. 10, 1962, 37/50,573
5 Claims. (Cl. 18—39)

This invention relates to the apparatus for manufacturing a sheet-shaped substance by the copolymerization of methyl methacrylate and its derivatives, styrol and its derivatives and other monomers. With the conventional apparatus for manufacturing the methyl methacrylate resin sheet, the liquid methacrylate, which is previously polymerized to be in a syrup-like condition, will be poured into between two sheet glasses which are arranged parallel to each other with a certain space between them. However, since the sheet glass used as a mold is liable to breakage with a sudden change in temperature, it requires a considerable time to make the rise or fall in its temperature. Besides, a sudden increase in the polymerization reaction will accumulate the heat accumulation for reasons of the heat conductivity and it is difficult to promptly get rid of the accumulated heat. Consequently it is required to effect the polymerization at a low temperature, which entails such disadvantages in manufacturing as a longer time for the polymerization as well as a greater wear and tear of the device because of a large breakage which occurs in handling it.

In view of the above-mentioned defects of the conventional apparatus, no sheet glass is used in the present invention. Instead, in the apparatus according to the invention, either two metallic plates, the surfaces of which are thoroughly flat and smooth and are so polished as to give them a mirror-polishing, or two metallic plates, which are joined with the supporting plates after having been plated with such comparatively hard metals as nickel, chrome and the like, or two supporting plates themselves, which are given a mirror-polishing after having been polished and plated with nickel, chrome or some other hard metal, are arranged to stand parallel to each other with a definite space between them and the methacrylate syrup or styrol syrup will be poured into between these plates. For reasons of using the metallic plates, there is no breakage in the device due to a sudden change in temperature. Consequently in comparison with the sheet glasses, the rise or fall in temperature of these metallic plates can be effected in a shorter space of time and, also for reasons of the metallic plates, the heat conductivity is far greater than the sheet glasses, so that heating as well as cooling can be achieved quicker and the heat generated by the polymerization can be rapidly cooled off, thus making it possible to freely control the temperature and to effect the polymerization at a higher temperature than the sheet glasses. For reasons of the above two advantages, the manufacturing time per one resin sheet can be greatly reduced in comparison with the conventional glass frame apparatus.

Other objects and advantages of the invention will become apparent from the detailed description which follows when taken in conjunction with the accompanying drawings, in which.

In the accompanying drawings, 1 denotes the metallic plate which is thoroughly flat and smooth in its surface and is 0.5–5 mm. thick. It is made of either iron or stainless steel or brass or copper and the mirror-polishing is given to it after the polishing and buffing in case of the stainless steel and after the plating with nickel, chrome and the like in case of the iron, brass and copper. 2 indicates the supporting plate which serves to support the said metallic plate 1, to transmit the heat which is required in the polymerization to the polymerizing liquid through the metallic plate 1, to anneal the polymerized substance and finally to cool the said substance. Consequently, in order to make the said supporting plate perform as the heat exchanging plate, it is provided in its interior with a plurality of the passages 5, 5 for the circulating steam, water or hot water that permits a uniform distribution of its surface temperature. 3 is the binding layer that joins the metallic plate 1 and its supporting plate 2. It is made of the bonding agent comprising the organic compounds that bind both metallic plates or the alloy of a low melting point. 4 is a kind of the surface plate that determines the thickness of the synthetic resin sheet to be shaped. It is a strip of a magnetic plate made in agreement with the thickness of the synthetic resin sheet to be manufactured. As a result, it can bind the metallic plate 1 to any position in the iron plated supporting plate 2 through its magnetic force.

Figure 1:
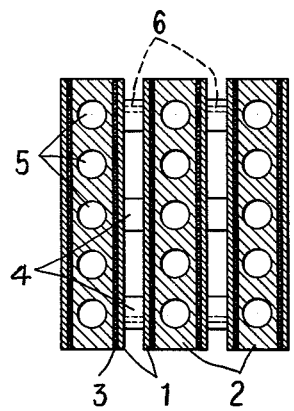
FIGURE 1 is a longitudinal section of the device embodying the present invention.
Figure 2:
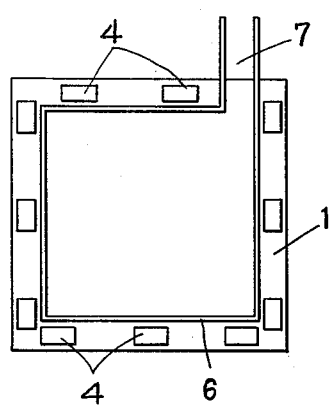
FIGURE 2 is a front view showing the interior of the device.
Figure 3:
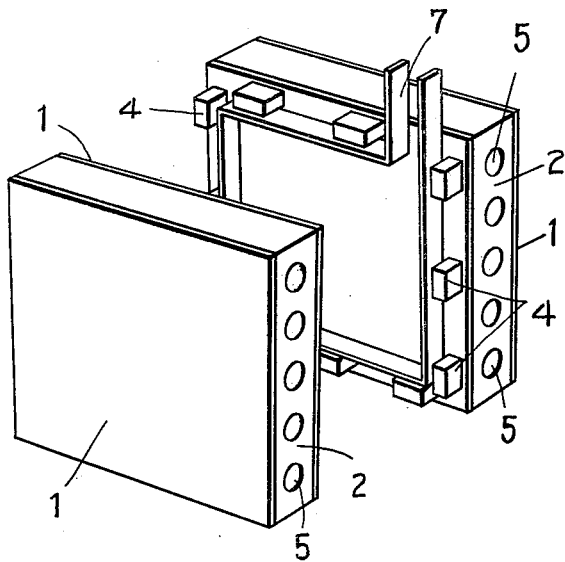
FIGURE 3 is an oblique view of the disjointed device.

Since a pair of the supporting plates can be combined into one body, while holding an exact space between them by dint of the magnetic plates 4 which are attached as many as required in the neighborhood of the circumferential part of the metallic plate 1, a strip of packing 6 will be inserted between the metallic plates 1, 1 so as to be inside the magnetic plates 4, making both sides of the magnetic plates stick closely to each one of the metallic plates 1, 1, and to protrude upward both ends of the packing 6 in order to form the inlet 7, as shown in FIGURES 2 and 3. In such a mechanism, there are advantages that, as long as each magnetic plate 4 is made to have an exactly same thickness, the space between the metallic plates 1, 1 will be constantly kept definite regardless of the position of the magnetic plate 4 and there is no apprehension that the thickness of the manufactured synthetic resin sheet lacks in uniformity, while the size and shape of the manufactured resin sheet can be varied as required by changing the arranged condition of the packing 6.

In addition to the above-mentioned advantages in the heat polymerization of the synthetic resin sheet attained by utilizing the characteristics of various metals, the present device has the great advantage over the conventional one in the manufacturing process of the said resin sheet. Since the conventional polymerizing device is of an external heating system, it requires such a complicated and troublesome heating process as first immersing it into the hot water until it is heated up to 50°–70° C. and then, after taking it out of the hot water, putting it in the air bath to heat it up to 100°–145° C. In contrast to such a troublesome and inefficient conventional device, the present device is of an internal heating system that utilizes the above-mentioned passages 5, 5, which enables to effect the polymerization and annealing processes in a single process without moving the device, greatly reducing the time and power required for these processes. The following are the examples embodying the present invention:

*Example 1*

As the metallic plate 1, is used the brass plate of 1.5 mm. thickness which is plated with nickel after being thoroughly polished and, as the supporting plate 2, is used the soft copper plate of 40 mm. thickness wherein is provided a plurality of the passages 5, 5 to which are connected the pipes for the steam, hot water and cooling water and, by switching their valves, either the steam or hot water or cooling water is allowed to freely pass through the passages 5, 5.

As the adhesive layer 3, is used the bonding agent of a rubber series and, under the condition of 150° C., 10 kg./cm.² and press binding time of 20 minutes, the metallic plates 1, 1 are pressed against both sides of the supporting plates 2. As the magnetic plate 4, is used the ferrite core of 3 x 10 x 30 mm.

In case of manufacturing the acrylic resin sheet of 3 mm. thickness,

Hot water circulation—First stage 75°–65° C. for 1.5 hour.
Steam circulation—Second stage 100°–130° C. for 1.0 hour.
Cooling water circulation—Third stage 60°–25° C. for 0.5 hour.

The present invention is not restricted to the foregoing example. For instance there can be used as the metallic plate, a stainless steel plate which is polished and further buffed, and a latticed frame which permits the free passage of steam, and hot water as well as cold water and has the function of heat exchange, can be used as the supporting plate 2, while in addition to various kinds of the bonding material, soft solder and the like can be used.

While preferred embodiments of the invention have been described above in detail, it will be understood that numerous modifications might be resorted to without departing from the scope of the invention as defined in the following claims.

What is claimed is:

1. Apparatus for manufacturing thin synthetic resin sheets, comprising a pair of spaced metallic plates each having a mirror polished surface opposed to the mirror polished surface on the other plate, a supporting plate for at least one of said metallic plates, said supporting plate being of good heat conducting material and joined to at least one of said metallic plates in heat conducting relationship with said at least one metallic plate, said supporting plate having at least one passageway therethrough and opening out of the supporting plate for conducting a heat exchange medium through the supporting plate, and sealing and spacing means around the peripheries of the opposed metallic plates and between the metallic plates spacing them a distance equal to the thickness of the sheet to be manufactured and sealing off the edges of the space between the metallic plates, whereby the synthetic resin can be poured into the space between the sheets and a heat exchange medium circulated through the supporting plate for controlling the temperature of the synthetic resin.

2. Apparatus as claimed in claim 1 in which there are a plurality of passageways in said supporting plate.

3. Apparatus as claimed in claim 1 in which said metallic plates are of a magnetic material and said spacing means comprises magnetic plates of uniform thickness equal to the desired spacing of the metallic plates, said magnetic plates being positioned at intervals around the peripheries of the metallic plates for spacing them from each other.

4. Apparatus as claimed in claim 1 in which said metallic plates are of a non-magnetic material and there is a supporting plate for each of said metallic plates, and said supporting plates are of a magnetic material, and said spacing means comprise magnetic plates of uniform thickness equal to the desired spacing of the metallic plates, said magnetic plates being positioned at intervals around the peripheries of the metallic plates for spacing them from each other.

5. Apparatus as claimed in claim 1 in which said sealing means comprises a gasket around the periphery of the metallic plates and positioned between the magnetic plates, said gasket having portions thereon extending out from between the plates to define between said portions a channel for pouring the synthetic resin into the space between the plates and within the gasket.

References Cited in the file of this patent
UNITED STATES PATENTS

| 2,328,525 | Egolf | Aug. 31, 1943 |
| 2,704,265 | Lyon | Mar. 15, 1955 |